March 13, 1962 J. F. McCLELLAN 3,024,700
MECHANICAL SHUTTER OF LARGE APERTURE AND HIGH SPEED
Filed April 8, 1959 5 Sheets-Sheet 1

*John F. McClellan*
INVENTOR.

March 13, 1962  J. F. McCLELLAN  3,024,700
MECHANICAL SHUTTER OF LARGE APERTURE AND HIGH SPEED
Filed April 8, 1959  5 Sheets-Sheet 2

John F. McClellan
INVENTOR.

March 13, 1962   J. F. McCLELLAN   3,024,700
MECHANICAL SHUTTER OF LARGE APERTURE AND HIGH SPEED
Filed April 8, 1959   5 Sheets-Sheet 5

John F. McClellan
INVENTOR.

United States Patent Office 3,024,700
Patented Mar. 13, 1962

3,024,700
MECHANICAL SHUTTER OF LARGE APERTURE
AND HIGH SPEED
John F. McClellan, Monkton, Md.
Filed Apr. 8, 1959. Ser. No. 804,900
5 Claims. (Cl. 88—61)

This invention relates to devices for controlling radiation, and particularly to mechanical shutters.

The principal object of this invention is to provide a high-speed shutter of large aperture, suitable for use with large solar furnaces, to define single, short-duration pulses of radiation, such as are used for materials testing.

Another object is to provide a shutter which transmits efficiently both parallel and convergent beams of radiation.

Further objects are to provide a shutter which is adjustable to give a wide range of exposures (or pulse durations), to provide a shutter, which is light and mobile, and relatively cheap to build, which requires little power to operate, and which operates reliably when mounted in any orientation with respect to gravity.

These and other objects of the invention will become more readily understood from the following specification and drawings.

Briefly described, a simple version of the shutter consists of an array of opaque vanes, radially mounted about a motor-driven hub.

Each vane is pivotable on an axis which runs along one of the long sides of the vane near the edge in a direction radial to the hub.

Each vane is of a breadth to overlap throughout its length the next adjacent vane axis to its right, when the vane is pivoted to its right, and to its left, when the vane is pivoted to its left.

All vanes are geared together to pivot simultaneously.

In the closed-shutter position, all vanes are pivoted to the right overlap position, or to the left overlap position, where together they form a disk, opaque to radiation perpendicular to the disk.

The open-shutter position lies midway between the right and left overlap positions. In this open-shutter position, the vanes are parallel to the radiation which the shutter is intended to control, and pass it with minimum attenuation.

The essence of the invention is the method of pivoting the vanes quickly from one overlap position to the other in the exposure cycle, to pass a very short-duration pulse of radiation, and the construction which permits this.

To operate the shutter to make an exposure, the vanes are pivoted to a closed shutter position and locked there by a releasable catch attached to the hub. The hub and vane assembly is then rotated by the motor drive in a direction such that the pivoted edges of the vanes are their trailing edges, and their unattached edges are their leading edges. Duration of exposure is inversely proportional to speed of rotation of the shutter hub and vane assembly. When the hub and vane assembly reaches the desired rotational speed, the catch is released, freeing the vanes to pivot.

Aerodynamic forces, induced by passage of the vanes through the air, pivot the vanes simultaneously and rapidly on their axes, opening the shutter, and closing it again as the unattached vane edges become the trailing edges. The vanes are held in this final position by the same forces which pivoted them, as long as the rotation continues, and they can, of course, be held also by the catch.

Acceleration forces are applied to each vane locally by this method of pivoting the vanes, thus precluding the need for heavy structure to transmit power. Because the pivoting forces act over broad areas of the vanes, the vanes are permitted to be of lightweight construction having a small inertia moment about the pivot axis. The shutter is recocked (the unattached edges of the vanes are again made the leading edges) by resetting the vanes to their initial position, or by reversal of rotation of the assembly.

These features allow high speed operation of large shutters. From the above it will be noted that the shutter, because of its radial vane construction, presents maximum clear aperture both to parallel and convergent beams of radiation, and further, that the operating principle of the shutter has no concern with the direction of the earth's gravitational field.

In the figures, a list of which follows next, each shutter embodiment bears a separate series of reference numerals, corresponding parts of different embodiments bearing corresponding numerals of different series.

For example, the vanes of the embodiment of FIGS. 1 through 8 bear reference numeral 221. The vanes of the embodiment of FIG. 12 bear reference numeral 1221. This system applies throughout the figures.

FIG. 1 diagrams a solar furnace;
FIG. 2 shows a shutter embodiment;
FIGS. 3, 4, and 5 are axial views of the FIG. 2 embodiment;
FIGS. 6, 7, and 8 diagram vane positions;
FIGS. 9, 10, and 11 are end-views of vanes;
FIG. 12 shows a second shutter embodiment;
FIG. 13 shows details of a third shutter embodiment;
FIGS. 14, 15, and 16 diagram vane positions;
FIGS. 17 and 18 show details of a fourth shutter embodiment; and
FIG. 19 shows a fifth shutter embodiment.

FIG. 1, a side elevation, shows the invention in use in a schematic solar furnace. A beam of radiation 102, 103, from a heliostat, not shown, or directly from the sun, passes as parallel light to concave mirror 104, and is reflected from the concave mirror as a convergent beam through the high speed shutter of this invention 207 to a focus at 105 the so-called "hot-spot," at which point objects to be irradiated are supported by table 106. Closure of the shutter shades the hot-spot vicinity from the focussed beam.

The high-speed shutter 207 is shown diagrammatically and partially. 243 is the hub and vane assembly 222 the drivemotor, 223 the supporting pedestal, 215 the pedestal base, and 101 is the ground.

FIG. 2, a side elevation, details construction of the basic shutter embodiment. Pedestal 223 mounts drivemotor 222 which is connected to a suitable electric power source by wires 242. A hub, or central member 225 is rigidly affixed by key 234 to shaft 224. Integrally attached to the hub by arm 226 is outer member 227. The hub and outer member have radially opposed bearing holes 228 and 229 respectively.

Pivoted in these holes are the vane members 221, whose blades 241 are eccentric to their pivot axes 230.

Integrally affixed to each vane is a gear 231 which meshes with collector gear 232. The collector gear is freely rotatable about the shaft 224, and is retained on the shaft by keeper 233 which may be affixed integrally to the shaft.

To lock the vanes in selected pitch position, linkage members 238, 239, and 240 are manually operated to advance sliding ring 237 and its integrally attached catches 235 in their holes 244 to engage the linkage catches in holes 236 in the collector gear when the two sets of holes are opposed.

To release the vanes, the linkage is operated in reverse.

Figure 7:
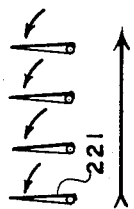
Figure 3:
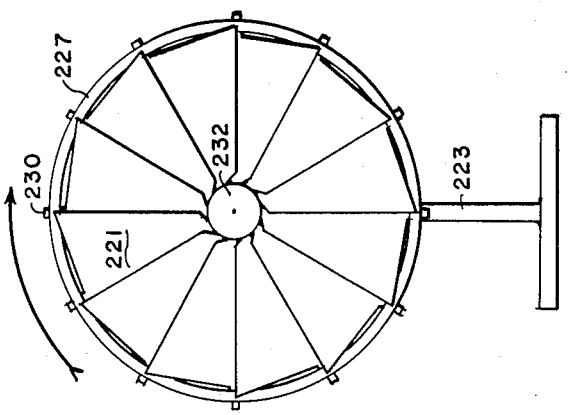
FIG. 3 is a view of the closed shutter along its axis of rotation, or optic axis. The shutter is rotating, with the unattached edges of vanes 221 leading in the direction of rotation (arrow) and is therefore cocked.

FIG. 7 correspondingly diagrams four of the vanes in the open-shutter position.

Figure 5:
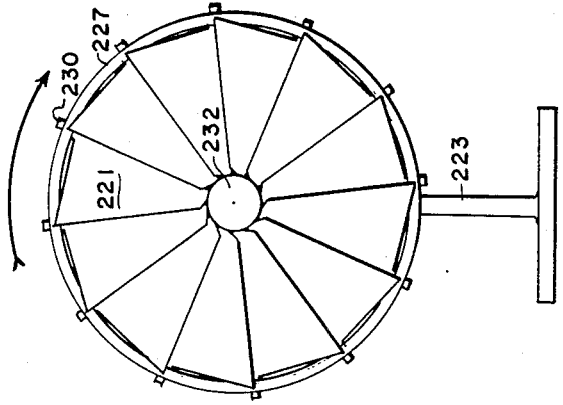

FIG. 5 shows the shutter closed at the completion of its cycle of operation. The vanes 221 are at rest in overlap, with their unattached edges trailing.

Figure 8:
Figure 4:
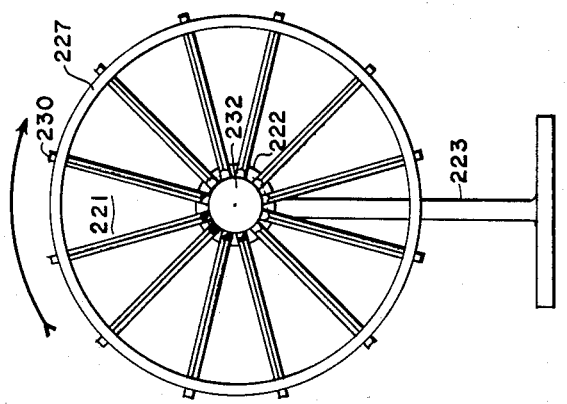
FIG. 4 shows the shutter released and in the fully open position with the pivoting vanes 221 at the position of maximum clear aperture.

FIG. 8 diagrams four of the vanes in this final position.

Figure 9:
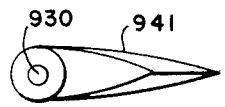
Figure 10:
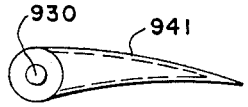
Figure 11:
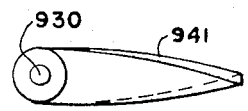

FIGS. 9, 10, and 11, are end views of typical vanes viewed radially outward from the hub, illustrating possibilities of tailoring vane shape to various shutter applications. The vanes are preferably of hollow, welded construction with polished metal surfaces. In these figures 930 is the vane axis, 941 the vane blade.

Figure 1:
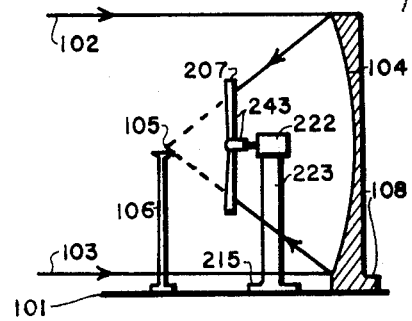
Figure 2:
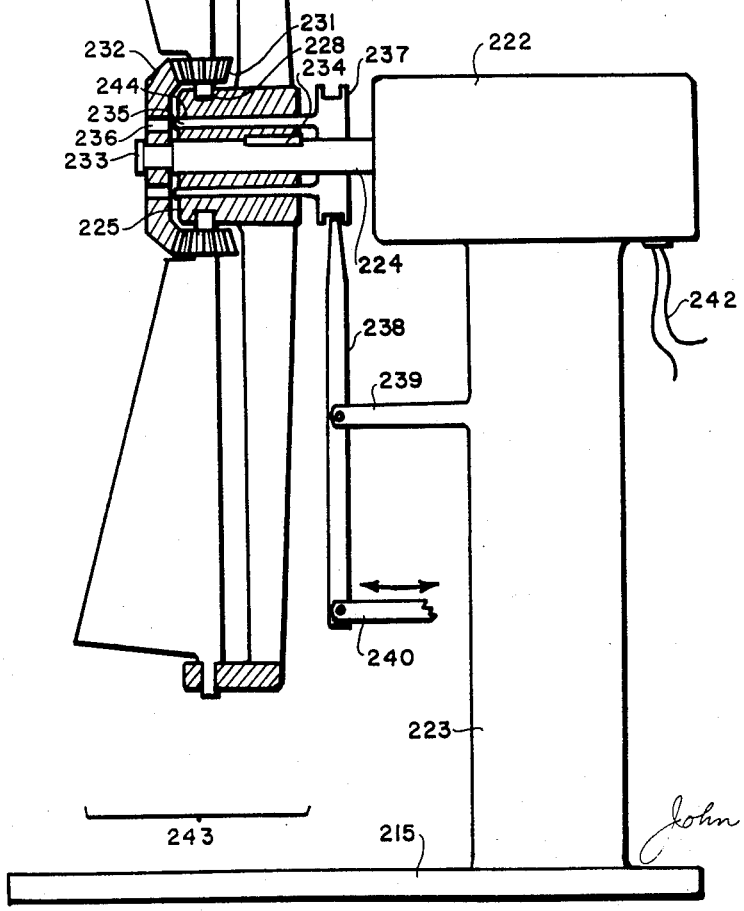
Figure 12:
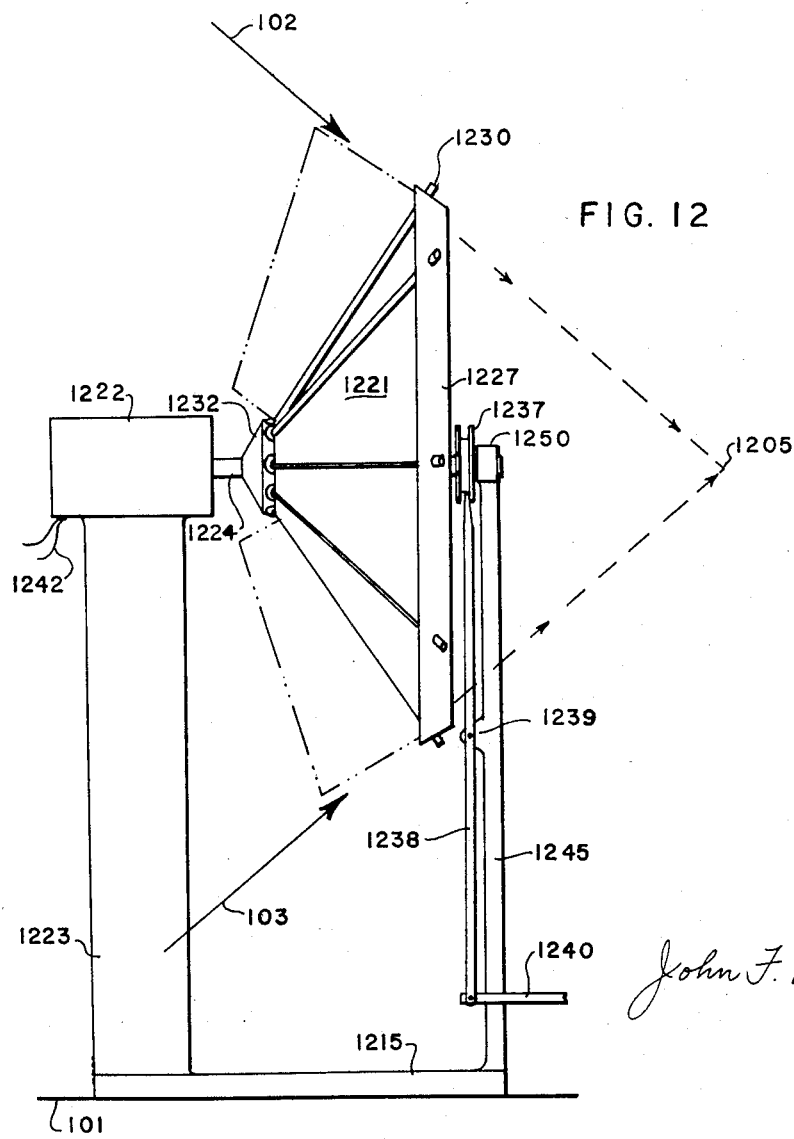

FIG. 12 illustrates an embodiment of the invention in which the vane pivot axes 1230 are conically divergent from a point on the hub axis. This arrangement enlists centrifugal force to assist in opening the vanes and to soften their closure. Shutter construction details are similar to those of FIG. 2 except that the motor 1222 is on the side toward which the vanes open and a second bearing member 1250 supported by pedestal 1245 helps to support the shaft 1224 and releasable brake linkage members 1238, 1239, 1241.

Figure 13:
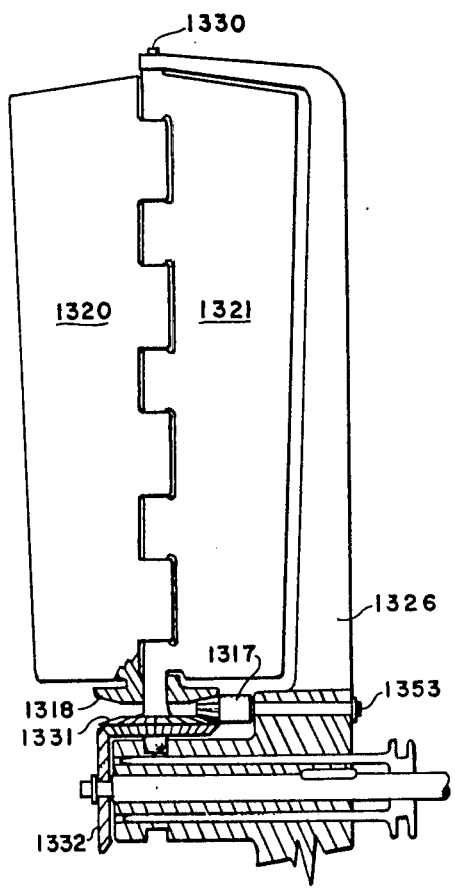

FIG. 13 is a side elevation in partial section showing an embodiment of the invention in which vanes are mounted in opposed pairs on single pivot axles. The paired vanes pivot in opposite directions on operation of the shutter. Motion of vanes 1320 is synchronized with that of vanes 1321 through gears 1318, 1331, and idler 1317 which is mounted in support arm 1326, on shaft 1253.

Figure 6:
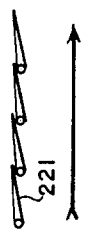
FIG. 6 shows in developed sectional diagram four of the vanes in this cocked-shutter position.
Figure 14:
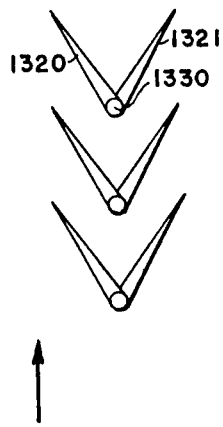
Figure 15:
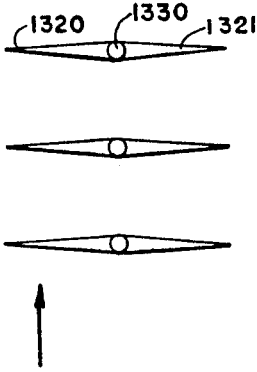
Figure 16:
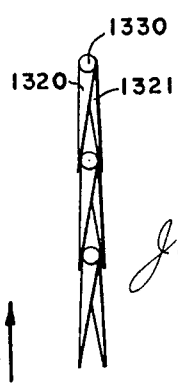

FIGS. 14, 15, and 16 are diagrams similar to FIGS. 6, 7, and 8 and show respectively typical vanes, in the initial shutter-closed, the shutter-open, and the final shutter-closed positions, during modulation of radiation by the paired vane version. The arrows indicate direction of shutter rotation. In all respects except those just described, construction details of this embodiment are like those of the FIG. 2 embodiment. In the initial position of FIG. 14, the vanes overlap, although they are locked in a slightly "open" position.

Figure 17:
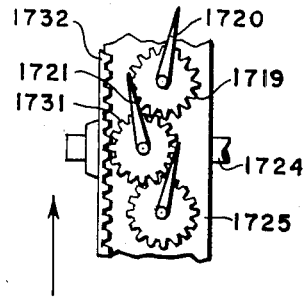
Figure 18:
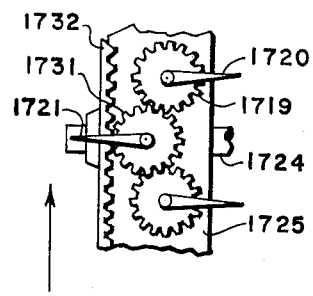

FIG. 17 is a developed diagram similar to FIGS. 14–16, illustrating an embodiment of the invention employing two opposed rows, or radial arrays, of vanes, which are geared together to pivot in opposite directions. Pivotal motion of vanes 1720 and 1721 is synchronized by their gears 1731 and 1719 and collector gear 1732. Construction details other than those just described are similar to those of the FIG. 2 embodiment. Operation is similar to that of FIGS. 14, 15, and 16. FIG. 18 diagrams this double-row version in its open-shutter position, in similar manner to FIG. 15.

Figure 19:
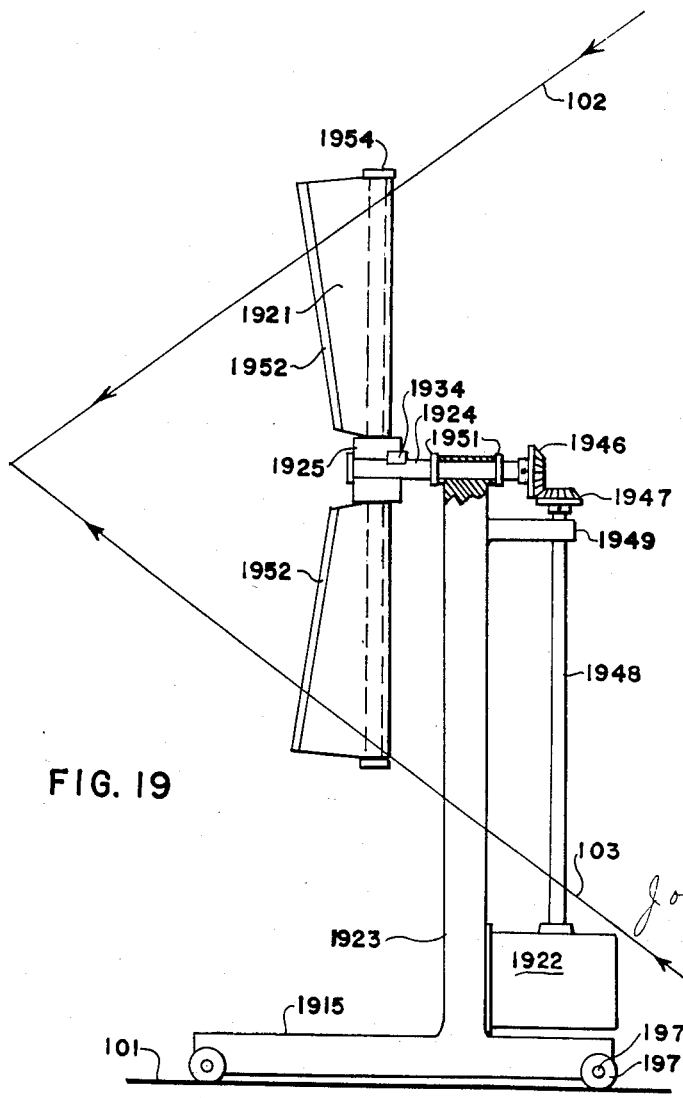

FIG. 19 is a composite shutter showing in a single embodiment several features which are optional in the other embodiments described. First, the vanes 1921 are pivoted on capped axles 1954 fixed to the hub 1925. No outer member is used. Secondly, the propulsion means 1922 is fixed to the lower pedestal to reduce shadowing. The hub and vane assembly is remotely driven through shaft 1924, bevel gears 1946, 1947, and motorshaft 1948. Bearing 1949 is provided on the pedestal for the motorshaft, which has integral thrust bearings 1951. Thirdly, no brake or linkage mechanism is used. The vanes are caused to pivot through their exposure cycle (FIGS. 6, 7, 8) by acceleration of the assembly. Fourthly, weights 1952 may be added to selected portions of the vanes 1921, as desired, to alter their pivotal characteristics. Finally, wheels 1976, on axles 1977 are mounted on the pedestal to permit axial thrust adjustments as shutter operates.

Obviously, many other variations of the present invention are possible in the light of the above teachings. For example, the cycle of operation may be started from the open-shutter position or ended at the open-shutter position by appropriate placement and use of the catch described and by appropriate vane stops. It is therefore to be understood that within the scope of the appended claims the invention may be practiced other than as specifically described.

What is claimed is:

1. A shutter comprising a plurality of vanes, a member having an axis of rotation, said member adapted to support said vanes in pivoted eccentricity about pivot axes divergent from said axis of rotation, releasable catch means attached to said vanes and adapted to constrain pivotal motion of said vanes about said pivot axes, means including a bearing to support said member rotatably, propulsive means to rotate said member and vanes together about said axis of rotation, whereby on release of said catch means said vanes pivot on their axes in response to kinetic forces induced by said rotation.

2. A shutter for operation in a gaseous medium comprising plural eccentric vane means, hub means, means to mount said vane means to said hub means pivotally about axes in divergent array about said hub means, releasable catch means engaging said vane means to constrain pivotal motion of said vane means, bearing means to hold said hub means rotatably, and propulsive means to rotate said hub means and vane means together as a unit whereby on release of said catch means during said rotation, the vane means are released to pivot in response to aerodynamic forces induced by their motion through said gaseous medium.

3. A shutter comprising a plurality of eccentric vane members, hub means having an axis of rotation, said vane members and hub means having pivot members, said pivot members adapted to support said vane members to said hub means pivotally on axes arrayed in conical divergence about said axis of rotation, releasable linkage means to lock pivotal motion of said vane members bearing means to support said hub means rotatably, and propulsive means to rotate said hub means and vane members as a unit about said axis of rotation, whereby on release of said linkage means, the eccentricity of said vane members causes them to pivot in response to said rotation.

4. A shutter as described in claim 3, said hub means comprising inner and outer spaced members having opposed pivot members, said pivot members adapted to support said vane members pivotally.

5. A shutter for operation in a gaseous medium comprising a plurality of paired eccentric vane members, hub means having an axis of rotation, pivot members on said vane members, said hub means having pivot members, all said pivot members adapted to support said paired vane members to said hub means pivotally about axes radially divergent from said axis of rotation, releasable linkage means to stay pivotal motion of said vane members about said axes, pedestal means to support said hub means rotatably, and propulsive means to rotate said hub means and vane members about said hub means axis of rotation, whereby on release of said linkage means during said rotation, the vane members of each said pair are caused to pivot in opposite directions by aerodynamic forces induced by said rotation.

References Cited in the file of this patent

UNITED STATES PATENTS

| 1,900,919 | Dina | Mar. 14, 1933 |
| 1,949,455 | Dina | Mar. 6, 1934 |
| 2,029,863 | Earle | Feb. 4, 1936 |

OTHER REFERENCES

"Sky and Telescope," November 1958, pp. 4 and 5 relied on.